United States Patent [19]

Hammond

[11] Patent Number: 4,546,513
[45] Date of Patent: Oct. 15, 1985

[54] ICE BREAKER AND SCRAPER

[76] Inventor: Michael D. Hammond, 2040 Monday Dr., Elgin, Ill. 60120

[21] Appl. No.: 592,277

[22] Filed: Mar. 22, 1984

[51] Int. Cl.⁴ .................................................. B60S 1/04
[52] U.S. Cl. .................... 15/105; 15/236 R; 15/236 C; 30/169; 37/266
[58] Field of Search ............... 15/236 R, 236 C, 105; 29/81 G, 81 J; 30/169, 170, 172; 37/266

[56] References Cited

U.S. PATENT DOCUMENTS

| 1,405,550 | 2/1922 | Nicol | 15/105 X |
| 1,799,588 | 4/1931 | Hurlburt | 15/105 X |
| 3,110,054 | 11/1963 | Askew | 15/236 R |
| 3,261,095 | 7/1966 | Nelson et al. | 30/169 |
| 3,597,785 | 8/1971 | Zinda et al. | 15/105 X |
| 4,141,111 | 2/1979 | Hopkins et al. | 15/236 R |
| 4,188,696 | 2/1980 | Collins et al. | 29/81 J |

Primary Examiner—Chris K. Moore
Attorney, Agent, or Firm—Paul W. Grauer

[57] ABSTRACT

An ice scraper and breaker combination comprising a common hand-held blade scraper upon which is mounted, to the back of the body of the scraper, multiple sets of toothed rollers or disks which are used to break up the ice prior to scraping.

1 Claim, 3 Drawing Figures

ICE BREAKER AND SCRAPER

BACKGROUND OF THE INVENTION

This invention relates generally to hand-held ice scrapers which are particularly used in cold climates to clean ice from automotive windshields and other surfaces.

Ice scrapers, which apply forces parallel to the surface, for cleaning ice from automobile windshields and other glass surfaces are well-known in the art. Most such scrapers employ a fixed blade arrangement attached to some form of handle. Such blade scrapers are disclosed in U.S. Pat. No. 4,164,801 to Thomas and U.S. Pat. No. 4,275,476 to Hopkins and Thomas. Certain of these patents also disclose fixed ice chippers generally mounted on the blade section. See, for example, U.S. Pat. No. 4,275,476 to Hopkins and Thomas which discloses a fixed ice chipper which is used to deflect and break up the ice as the ice travels up the scraper blade after having been lifted from the windshield or other surface. These fixed chippers are used to break up the ice after it has been scraped off of the surface by the blade. The basic action, however, of these scrapers is parallel to the surface being scraped.

There are formations of ice, however, which almost defy removal by parallel scraping action. Generally these ice formations are described as "glazed" ice or "ice sheets" and are commonly produced by "freezing rain" or moisture striking a surface which is below freezing. Many times such glazed ice is relatively thin but no reasonable amount of parallel scraping action will allow the scraper to crush or impinge upon the edge of the ice to lift the ice from the surface. Such common blade scrapers are primarily designed to produce forces generally parallel to the surface being scraped and as such must first break through or crush the ice before they are effective.

It is an object of this invention to provide an improved ice scraper which applies primarily vertical forces to the ice through the use of notched-like rollers which break up the ice so it can then be more readily removed by the parallel scraping action of the common fixed blade scraper.

SUMMARY OF THE INVENTION

Accordingly, it is the primary object of the present invention to provide an improved hand-held ice scraper which applies primarily vertical forces to the ice by means of notched-like rollers.

It is a further object of the present invention to provide a device which may be mounted to a common blade scraper which allows the user to apply vertical forces to the ice before applying parallel forces.

It is another object of the present invention to chip and break the ice before attempting to remove it by scraping action.

It is also an object of the present invention, in one of its forms, to provide an ice breaking means which may be detachably mounted to the back of a common hand-held scraper.

It is a further object of the present invention to provide a crushing action to the ice by means of tooth-like rollers or disks which rotate as they are pressed against and moved across the icy surface.

It is another object of the present invention to provide toothed rollers or disks which are mounted angularly with respect to the normal direction of travel of the scraper such that simultaneously vertical forces and lateral forces are applied to the ice.

It is another object of the present invention to provide primarily vertical forces over a relatively large surface area in a relative short period of time.

It is a further object of the present invention to prevent premature damage, chipping or wear to the scraper blade by providing the user with a means whereby he can break the ice into more conveniently removable pieces before commencing to scrape.

Finally, it is an object of the present invention to reduce the likelihood of grit or small foreign particles scratching the surface of the windshield being cleaned due to the reduced scraping force necessary after the ice has been broken up by the notched-like rollers.

While the invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

DESCRIPTION OF THE PREFERRED EMBODIMENT

Figure 1:
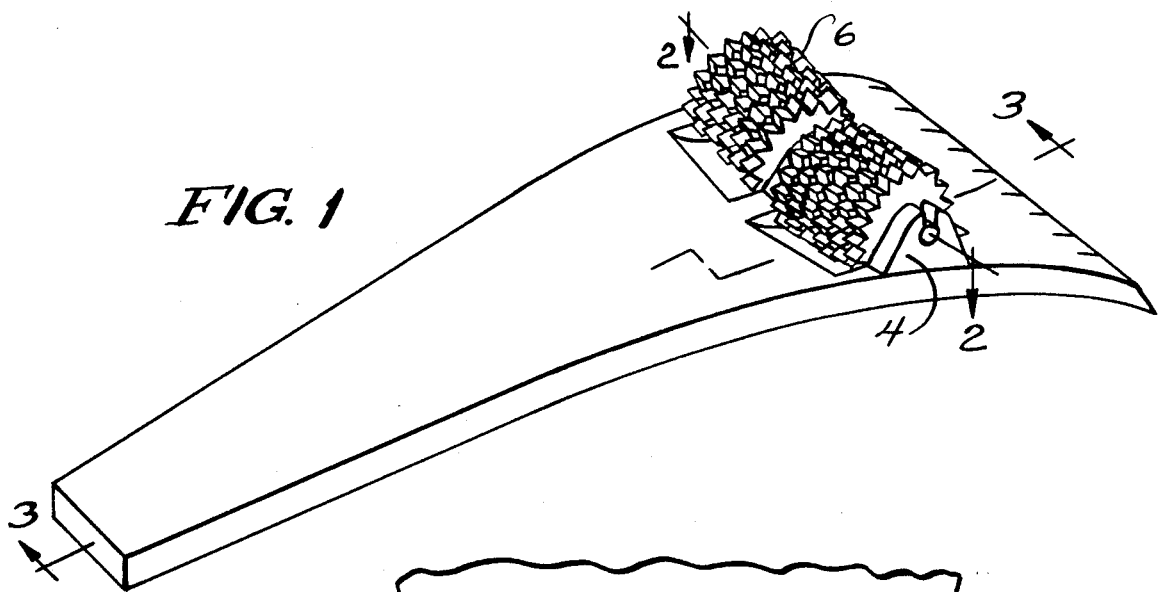
FIG. 1 is a perspective view of the hand-held scraper employing a preferred embodiment of the present invention.

Referring now to FIG. 1, there is shown a common hand-held scraper 1 which has the preferred embodiment of the invention mounted on the topside 10 of the body section 11 of the scraper 1. The roller section 8 is mounted on the topside 10 of the scraper 1 merely for convenience and it should be understood that the roller section 8 could be mounted at any other convenient location on the scraper 1. It would also be within the purview of the invention, although not preferred, to mount the roller section 8 on a body section 11 where the blade section was deleted. However, the preferred embodiment shows the roller section 8 mounted at the most convenient position. Again, while not shown in the preferred embodiment, it would also be contemplated to mount the rollers 8 onto the scraper 1 in a detachable fashion so that the roller sections 8 could be mounted to ice scrapers which currently exist in the market place. The preferred embodiment does not show the detachably-mounted version because the mounting would be by any means commonly known in the art and is not part of the invention. It can be noted in referring to FIG. 1 that the roller section 8 consists of rotational rollers 6 or disks which have notched-like surfaces 7 which are arranged circumferentially around the disks or rollers 6. In the preferred embodiment, it will also be observed that the rotational rollers 6 are mounted at a slight angle O with respect to the axis represented by the imaginary center line 3—3. The preferred embodiment employs the rotational rollers 6 at multiple planes since the angularity of the rollers improves the ice breaking and crushing action of the rollers 6 during operation. The angularity also provides a self-cleaning aspect to the notched-rollers 6 such that there is a reduced build-up of ice and snow in the rollers during operation. The handle 3 and blade sections 2 located on either side of the body section 11 are known in the art. It can also be observed in FIG. 1 that the roller sections 8 are inset or somewhat depressed within the topside 10 of the body section 11. The rollers are set within this depression simply to keep the scraper at a low profile, and it has also been found to aid the user in applying vertical force to the windshield when he's using the scraper during the rolling and crushing operation.

Figure 2:
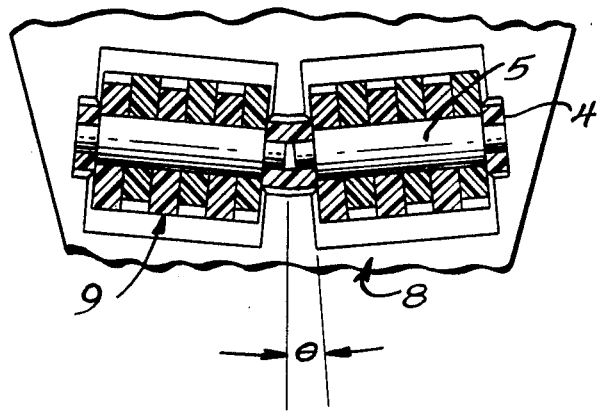
FIG. 2 is an enlarged detail view of one of the disks in the roller section of the preferred embodiment of the present invention.

Reference now being made to FIG. 2, there can be seen a cross-section of the rotational rollers 6 which shows in more detail the independently rotational rollers 6 which can be configured to rotate in multiple planes. The rollers 6 can rotate in multiple planes which are either perpendicular to the blade 2 of the scraper 1 or at some angle, shown in FIG. 2 as Theta $\theta$, with respect to the center line 3—3 of the scraper. The preferred embodiment uses sets of mounting ears 4 mounted on the topside 10 of the body section 11 of the scraper for mounting the rotational rollers 6 to the scraper. The preferred embodiment utilizes, because of ease of manufacture, a small axis 5 mounted between the mounting ears 4 and having each independent rotational roller 6 or disk mounted on the small axis 5 and then the assembly snapped into position between the mounting ears 4. Since most of the hand-held scrapers on the market are plastic, it is contemplated that the rotational rollers 6 and axles 5 would be plastic-like and therefore, the mounting ears 4 would be molded directly on the topside 10 of the body section 11 of a common scraper. Again, FIG. 2 shows that each of the rotational rollers 6 or disks can rotate independent of one another and, therefore, achieve a self-cleaning action so that the notched-like rollers don't build up with ice and snow during use. The individual disks or rollers 6 of each roller section 8 also allow a multiple of small contacts to be made between the rollers 6 and the surface of the ice when they are pressed against the ice by the user during operation. This has a tendency to crush and break up the ice in an effective fashion.

Figure 3:
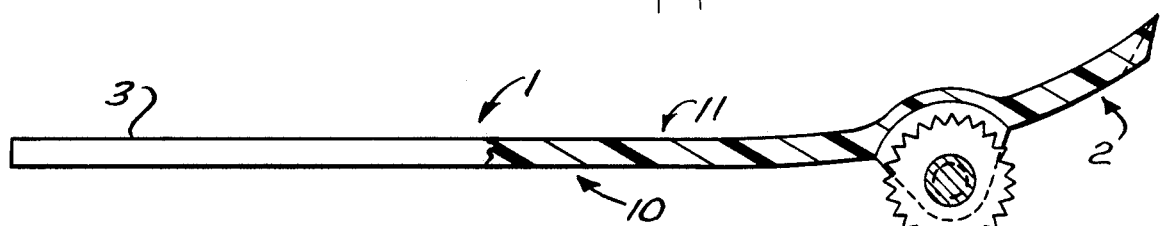
FIG. 3 is a sectional view of the roller section of FIG. 1 taken along line 3—3.

FIG. 3 shows a cross-section view of the roller section 8 mounted on the topside 10 of the scraper 1. As explained earlier, the roller section 8 is somewhat depressed within the body section of the scraper, both to maintain a low profile of the roller section 8 on the scraper and also to allow the user to apply more leverage as the scraper is rolled across the windshield or other surface that is being crushed prior to scraping.

From the above description, it is seen that an ice scraper and breaker is provided which enhances the operator's ability to remove ice from automotive windshield and other surfaces by applying both vertical forces by means of the invention and parallel by means of the common hand-held scraper which is known in the art.

I claim:

1. A hand-held scraper for removing ice from a surface, said scraper comprising:
   a body section with a topside;
   a handle connected to one end of the body section;
   a blade section connected to the other end of the body section;
   a roller section connected to the topside of the body section between the handle and blade section; and
   a plurality of rotational rollers having notch-like surfaces circumferentially mounted in the roller section which rotate independently to break up the ice.

* * * * *